UNITED STATES PATENT OFFICE.

FRANCIS WILLIAM PASSMORE, OF LONDON, ENGLAND.

PREPARATION OR REGENERATION OF RUBBER OR CAOUTCHOUC.

No. 924,101.     Specification of Letters Patent.     Patented June 8, 1909.

Application filed March 30, 1907. Serial No. 365,509.

*To all whom it may concern:*

Be it known that I, FRANCIS WILLIAM PASSMORE, of 63 Queen Victoria street, in the city of London, England, consulting chemist, have invented certain new and useful Improvements in the Preparation or Regeneration of Rubber or Caoutchouc, of which the following is a specification.

This invention relates to the preparation or regeneration of rubber or caoutchouc from rubber waste, crude rubber or other material containing the same.

Cineol or eucalyptol, either synthetically produced or obtained from essential oils, or it may be essential oils containing the said substance, possess the property of dissolving caoutchouc and I have found that caoutchouc may be recovered from such solution in a high state of purity and capable of being vulcanized.

By the employment of cineol or eucalyptol as a solvent for caoutchouc, I am able to prepare concentrated solution of caoutchouc at moderately low temperatures, the characteristic physical qualities of the caoutchouc obtained being unaffected, while impurities such as mineral matters, tissues and the like insoluble in cineol or eucalyptol can be removed by mixing the concentrated eucalyptol solution of caoutchouc with a volatile diluent benzene or like liquids miscible with eucalyptol and which do not precipitate the caoutchouc from such solution. The caoutchouc may be recovered from such solution by distilling off the eucalyptol with steam or by precipitating the caoutchouc from the eucalyptol solution by means of alcohol or acetone or a similar precipitating agent miscible with eucalyptol or cineol.

The manner in which the invention can be carried into effect will be understood from the following example.

Example I: The crude rubber, rubber waste, or caoutchouc containing material in the form of scraps is reduced to a pulp by suitable mechanical means, and then digested, preferably in a closed digester provided with a stirring arrangement, with 4 to 8 parts by weight of eucalyptol to one part of scrap. The contents of the digester are heated by means of a bath to a temperature of about 120–140° C., the mass being thoroughly stirred until solution is complete. The solution of caoutchouc, which is of a very thick viscous character is thinned with three, four or more volumes of benzene or other diluent, and the mineral matters and other insoluble portions of the scrap are allowed to deposit or are removed by filtration. The clear solution of caoutchouc is then run into a still and the benzene or other volatile diluent distilled off. Two or three volumes of water are then added to the residue in the still and steam is blubbered through the mass until the whole of the eucalyptol is driven over. The recovered caoutchouc is then drained from the water and dried on hot rollers in the usual way.

If desired the benzene or other diluent may be added to the material in the digester, but in general I prefer to add it after the mass has been removed from the digester.

Example II: The rubber waste or raw caoutchouc containing material is reduced to a pulp and dissolved in eucalyptol and freed from mineral and other extraneous matter in the same manner as described in Example I. The benzene or other diluent is then distilled off and to the gummy eucalyptol solution an excess of alcohol or acetone is added with constant stirring until the whole of the caoutchouc is precipitated as a gummy homogeneous mass. The liquor is poured off and the mass washed with alcohol until free from eucalyptol and finally washed with warm water and dried. The alcohol or acetone may be recovered from the poured off liquor by distillation and returned to the manufacture.

It will be understood that the above examples are given as instances only, and that I do not confine myself to the proportions and working details given therein, which may be varied without departing from the spirit of the invention.

What I claim and desire to secure by Letters Patent is:—

1. A process of preparing caoutchouc from rubber waste or other material containing the same, comprising dissolution of said material in eucalyptol, addition of a volatile diluent, separation of undissolved matter from the dilute solution, and separation of the caoutchouc from the eucalyptol.

2. A process of preparing caoutchouc from rubber waste or other material containing the same, comprising dissolution of said material in eucalyptol, addition of a volatile diluent, separation of undissolved matter from the dilute solution, removal of the diluent and separation of the caoutchouc from the eucalyptol.

3. A process of preparing caoutchouc from rubber waste or other material containing the same, comprising dissolution of said material or eucalyptol, addition of benzene, to the solution, separation of undissolved matter from the mixture, distilling off of the benzene and separation of the caoutchouc from the eucalyptol.

In witness whereof, I have hereunto signed my name in the presence of two subscribing witnesses.

FRANCIS WILLIAM PASSMORE.

Witnesses:
 WILLIAM HEATON THORNS,
 H. D. JAMESON.